(12) United States Patent
Kermanian

(10) Patent No.: US 10,160,666 B2
(45) Date of Patent: Dec. 25, 2018

(54) PERSONAL SYSTEM AND APPARATUS FOR SANITIZING WATER

(71) Applicant: Riley Kermanian, Beverly Hills, CA (US)

(72) Inventor: Riley Kermanian, Beverly Hills, CA (US)

(*) Notice: Subject to any disclaimer, the term of this patent is extended or adjusted under 35 U.S.C. 154(b) by 127 days.

(21) Appl. No.: 15/359,269

(22) Filed: Nov. 22, 2016

(65) Prior Publication Data

US 2018/0141829 A1    May 24, 2018

(51) Int. Cl.
*C02F 1/42* (2006.01)
*C02F 1/32* (2006.01)
*C02F 1/28* (2006.01)

(52) U.S. Cl.
CPC .............. *C02F 1/325* (2013.01); *C02F 1/283* (2013.01); *C02F 1/42* (2013.01); *C02F 2201/009* (2013.01); *C02F 2201/3221* (2013.01); *C02F 2201/3222* (2013.01); *C02F 2201/3227* (2013.01); *C02F 2303/04* (2013.01); *C02F 2307/02* (2013.01)

(58) Field of Classification Search
CPC .. C02F 1/78; C02F 1/325; C02F 1/008; C02F 2103/42; C02F 2201/326; C02F 2209/40; C02F 2209/02; C02F 1/00; C02F 2103/002; C02F 2201/009; C02F 2201/3222; C02F 2209/44; C02F 2307/06; A61L 2/202; A61L 2202/11; A61L 2/20; Y02A 20/212; E03C 2201/40; Y02W 10/37

See application file for complete search history.

(56) References Cited

U.S. PATENT DOCUMENTS

| | | | | |
|---|---|---|---|---|
| 3,512,647 A | * | 5/1970 | Young | E04H 4/12 210/167.14 |
| 6,419,821 B1 | * | 7/2002 | Gadgil | B01D 39/2068 210/109 |
| 2016/0289090 A1 | * | 10/2016 | Liao | C02F 1/325 |
| 2017/0057841 A1 | * | 3/2017 | Blood | C02F 1/325 |

* cited by examiner

*Primary Examiner* — Walter D. Griffin
*Assistant Examiner* — Cameron J Allen
(74) *Attorney, Agent, or Firm* — Omid E. Khalifeh; Omni Legal Group

(57) ABSTRACT

A portable fluid-sanitizing system and assembly configured for personal use are provided. The system and assembly combine mechanical and electrical methods for removing and/or deactivating harmful chemicals, molecules, atoms, ions, and even microorganisms from fluid. The system and assembly comprise a hand-holdable container that is sized to receive a filter, such as an activated carbon block capable of adsorbing or otherwise capturing a variety of undesirable contents from the fluid. Ultraviolet lights may be disposed along an inner or outer portion of the container and placed so that their emissions penetrate any fluid contents of the container. Finally, means for electrically powering the lights may be provided. The means may be mechanically operated, such as by mechanically inducing a current in a coiled wire, or by hand-cranking a dynamo in electrical communication with the lights. Thus harmful or undesirable contents may be physically filtered and further irradiated to provide potable water.

9 Claims, 6 Drawing Sheets

PERSONAL SYSTEM AND APPARATUS FOR SANITIZING WATER

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to water sanitization and, more particularly, to a portable electrical and mechanical system configured to decontaminate water.

BACKGROUND

The following is a tabulation of some prior art that presently appears relevant to the disclosure:

| U.S. Patents | | | |
|---|---|---|---|
| Pat. No. | Kind Code | Issue Date | Patentee |
| 4,849,100 | A | 1989 Jul. 18 | Rocco A. Papandrea |
| 5,106,495 | A | 1992 Apr. 21 | Harold Hughes |
| 7,226,542 | B2 | 2007 Jun. 5 | Marc I. Zemel, et al. |
| 7,862,631 | B2 | 2011 Jan. 4 | Stephen A. Yencho |
| 9,067,804 | B2 | 2015 Jun. 30 | Thomas L. Jones |
| Pub. No. | Kind Code | Pub. Date | Applicant |
| U.S. Pat. App. Pub. | | | |
| 2010/0147700 | A1 | 2010 Jun. 17 | Bruce F. Field, et al. |
| 2014/0102962 | A1 | 2014 Apr. 17 | Shih-Yi Chang, et al. |
| Foreign Pat. Doc. | | | |
| None found. | | | |

DISCUSSION OF THE RELATED ART

Water contaminated with human and animal fecal matter and other microorganisms is known to transmit a variety of diseases including, for example, diarrhea, cholera, dysentery, typhoid, and polio. The World Health Organization estimates that about 1.8 billion people use contaminated drinking water sources, and 502,000 people die of diarrhea caused by the consumption of unsanitary water (World Health Organization. (2015). *Drinking-water* [Fact Sheet]. Retrieved from http://www.who.int/mediacentre/factsheets/fs391/en/). Additionally, heavy metals and various debris may be present in water. These problems affect inhabitants and regional visitors alike. For example, so-called "traveler's diarrhea" is experienced by thousands of visitors to regions with unclean water sources each year and is caused by microorganisms in the water.

Some solutions have been proposed to sanitize potentially contaminated water for safely drinking on demand. One proposal, for example, has been to deposit chlorine and iodine tablets in the possibly contaminated water. Although effective, these introduce additional harmful chemicals into the water. To avoid this problem, microporous filters have been suggested to mechanically separate microorganisms and debris from the water. However, these are deficient as they require the water to be applied through the filter with heavy pressure over inconveniently long periods of time.

Other, less time consuming, filters may be placed in water-retaining receptacles to remove debris such as silt and dirt. Indeed, certain chemical filters have also been provided, such as those containing activated carbon, to remove other, harmful or distasteful chemicals. And still others, such as ion-exchange filters, have been proposed to remove heavy metals such as lead and copper. Still, none of these suggestions provide protection from organic matter such as bacteria and other microorganisms.

As still another example, some proposals have been to treat contaminated water by irradiating it with ultraviolet (UV) light. This may be done by placing the contaminated water in direct sunlight for an extended period of time or even direct an electric source of UV light at the water itself. Still, to date, these solutions are deficient for the amount of time required to effect sanitization and also the inconvenience of powering sources of light. Indeed, because of the need for electric power in some of these proposals, applications have been difficult to scale down for personal use and have thus been directed largely to industrial water sanitization.

Thus, there remains a need for an easily portable device and/or system that provides biological protection while also removing chemicals and heavy metals from water.

SUMMARY

The present disclosure is directed to embodiments of a portable water treatment system that includes physical means for filtering a fluid and electrical means for deactivating or killing contaminants, to provide drinkable water. The system is particularly configured to avoid a need of mixing chemicals into water intended for treatment.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In general, the system may include a reservoir operative to contain a fluid, such as but not limited to water, means for filtering contaminants within the contained fluid, one or more sources of light operative to emitting at a wavelength capable of killing or deactivating pathogens including, for example, bacteria and other microorganisms populating the contained fluid, and means for powering such lights.

More particularly, the reservoir may be formed as any container configured to retain fluid and may be further sized to receive a fluid-porous filter. For the sake of brevity, the fluid will be discussed as water available from any source such as a municipal water system, a well, or even a naturally occurring or other man-made body of water. Thus the fluid and source of the fluid should not limit the invention.

In one embodiment, the reservoir may be any container comprising a bottom end and an impermeable side wall extending upward therefrom to define a hollow interior for retaining the water. The container may comprise any shape that may be desired, such as a box or cylinder or other three-dimensional shape. Similarly, various materials may be available to comprise the bottle, such as for example, glass, high-density polyethylene, low-density polyethylene, copolyeester, or even polypropylene.

One or more lights may be disposed along an exterior of the container, to protect such lights from possible damage owing to contact with water therein, and further positioned to radiate inward toward any water in the hollow interior. Indeed, to ensure that such emissions are able to effectively interact with water therein, it is contemplated that the container may be at least partially transparent to transmit wavelengths from the lights that are operative to inactivate or kill contaminants in the water. Therefore, in one embodiment, the lights may radiate at lengths known to destroy some pathogens, such as bacteria and other microorganisms. For instance, the lights may emit in the ultraviolet (UV) range of about 100 nm to about 300 nm. In a preferred embodiment, the lights may radiate as shortwave UV-C waves between about 200-280 nm or any range known to deactivate and/or kill undesirable pathogens, bacteria, viruses, or microorganisms, which may be contained in water.

The number of lights provided may vary as needed. For instance, providing more lights may ensure that pathogens are inactivated or killed within a relatively short period of time, compared to the natural lifespan and/or reproductive cycle of undesirable pathogens, such as about 30 seconds to about 20 minutes, or more. Still, it may be desirable to minimize the number of lights used in an effort to decrease the overall weight and bulk of the system and apparatus.

In one embodiment, the lights may be light emitting diodes (LEDs), which those skilled in the art will recognize for their compact size, intensity, ability to emit light in a particular direction, relatively low energy consumption, and relatively longer lifetime than many conventional light sources. One skilled in the art will also recognize, however, that a variety of other lights are available and may be deployed to effect irradiation of contaminants in the water. Thus, LEDs are offered by way of example only and not of limitation.

Means are additionally provided to power the lights disposed along the exterior of the container. It is contemplated that such means may be enabled by mechanical methods. That is, the means may comprise elements to carry electricity to the lights, wherein the electricity is generated by an activity carried out by the user himself. In some embodiments, means for generating electricity to power the lights may comprise, for instance, a hand crank dynamo known to those skilled in the art. Such dynamo may be secured beneath the bottom end of the container and configured to be in electrical communication with the lights. When a shaft comprising the dynamo is cranked or rotated by the user, an electric charge may be generated that the dynamo may then deliver to the lights, causing them to radiate. The position of the dynamo may vary, however, it is contemplated that mechanical and electrical components may avoid damage if secured to an exterior portion of the side wall or even beneath the bottom end of the container, though permanent securement is not necessary to practice the invention. Still, in some embodiments, a chamber may be formed beneath the bottom end of the container to enclose at least a portion of the dynamo or other means for powering the lights. In such embodiments, the chamber may define a hole through which the shaft portion of the dynamo may protrude to enable hand cranking from an outside of the chamber.

In other embodiments, a current may be induced in a conductive coil electrically coupled to the lights such as by mechanically passing a magnet there through. Placement of the coil and magnet may similarly vary with respect to the container. For instance, the coil may be placed in a waterproof and insulated tube and then further secured within the hollow interior of the container. The coil may be placed in an insulated tube, or other form of protection, and secured to an exterior of the container. In any event, one skilled in the art will recognize that various means are available to selectively power the lights, which in turn will be operative to eliminate, or at least decrease, contamination in the water. Indeed, solar and battery power are also contemplated and may be deployed alone or in combination with other means for electrically powering the lights.

In addition to electrical methods of sanitizing fluid in a container, a fluid-porous filter may be provided to capture, trap, adsorb, or otherwise remove contamination from the water or other fluid in the container. For instance, a microporous active carbon filter may be provided to adsorb organic impurities that contribute to undesirable tastes and odors in water, as well as pollutants and chemicals such as chlorine, fluorine, and radon. Additives may be mixed with the active carbon to trap other undesirable contaminants. For instance, ion-exchange resins or polymers may be provided to remove ions from molecules defining poisonous and heavy metals from the water and replacing them with, or exchanging them for, ions that are safer for consumption.

In one embodiment, the filter may be formed as a block, receivable in the hollow interior of the container, and spanning the vertical length of the container. In some embodiments, effective filtration may be ensured by moving the filter, forcing contaminants in the water or other fluid to come into contact with particles and/or resin comprising the filter. Means for effecting this rotation are contemplated. For instance, in the event that the means for powering the lights is a hand crank generator, the shaft may be further configured to penetrate the bottom end of the container into the hollow interior of the container and link to the filter so that as the crank is rotated by hand, the filter will also effectively mix and filter water in the container. In such cases, a seal may be provided to prevent water or other fluid from seeping out of the container through the bottom end. As another example, the filter may be provided as a rigid cylinder formed and placed to define an inner wall within the hollow interior of the container. A user may agitate the water, causing it to flow through the wall defined by the filter, by shaking the container, for instance. Thus, various filters and orientations are possible and the foregoing are offered by way of example only and not of limitation.

The system may be sized for personal use. In one embodiment, for example, the container may be formed as a hand-holdable bottle, such as a water or other beverage bottle. Such bottle may be defined by any size desirable for transportation. For instance, a user may wish to conveniently transport the bottle in a backpack, sack, or purse. Indeed, it is contemplated that scaling the volume of the container down to a hand-holdable size, such as may be achieved by providing a container sized to retain about eight (8) fluid ounces to about 30 fluid ounces, may beneficially ensure that the contained fluid may be mechanically and electrically treated in a timely manner. That is, fewer contaminants may be contained in a lesser amount of water and thus require a shorter exposure and filtration time to become potable. This may in turn decrease the weight of the assembly, making it more convenient and comfortable for transportation.

Thus, it is an object of the invention to combine mechanical and electrical methods for removing and/or deactivating harmful chemicals, molecules, atoms, ions, and even microorganisms from fluid to make it safer for consumption.

It is another object of the invention to make sanitization devices easily portable.

It is still another object of the invention to avoid dependence on energy sources which might be difficult to attain in rural environments.

It even still another object of the invention to avoid chemically treating fluids intended for consumption.

One or more of the above-disclosed embodiments, in addition to certain alternatives, are provided in further detail below with reference to the attached figures. The disclosed subject matter is not, however, limited to any particular embodiment disclosed.

Figure 1:
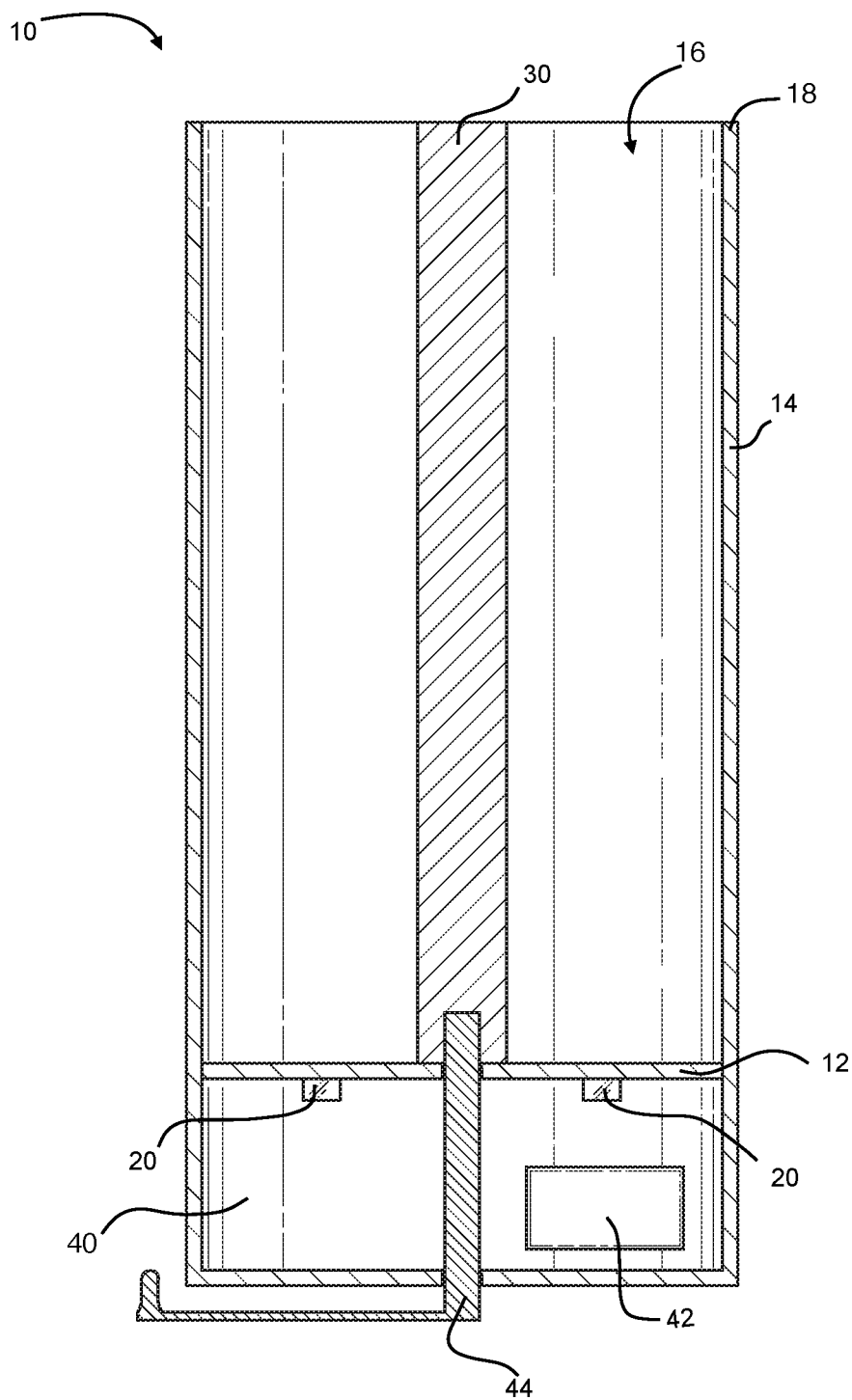
FIG. 1 shows a cross-sectional view of one embodiment of the personal water sanitization system.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

With reference to the figures, it may be seen that FIGS. 1 through 3 and FIGS. 4 through 6 show various views, respectively, of alternative embodiments comprising the system and apparatus for sanitizing water, or other fluid.

Figure 4:
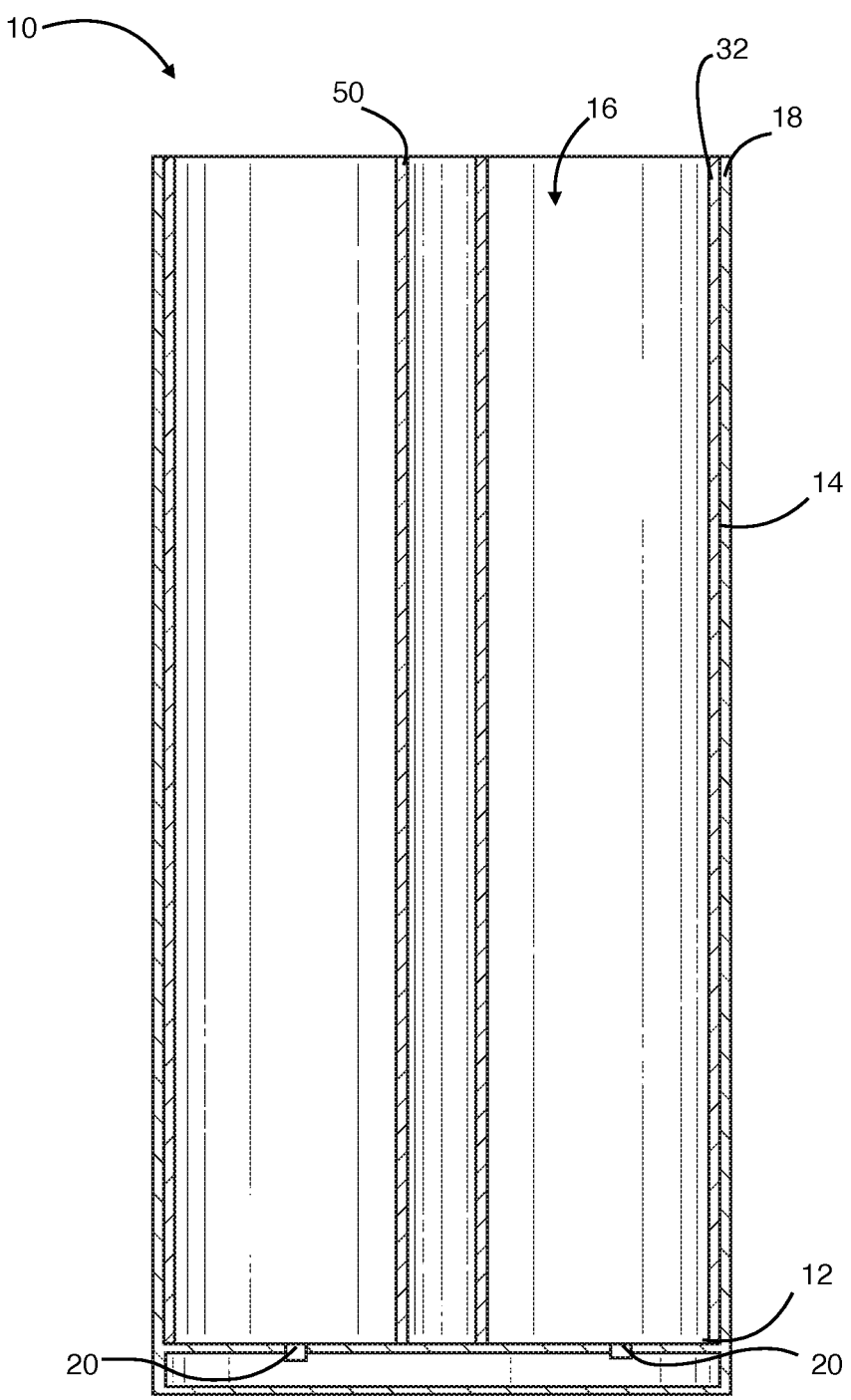
FIG. 4 shows a cross-sectional side view of another embodiment of the personal water sanitization system.

Thus, referring for example only and not limitation to FIGS. 1 and 4, the system may comprise a reservoir or container 10 formed as a hand-holdable bottle, such as a water or other beverage bottle having a bottom end 12 and a sidewall 14 extending upward therefrom to define a hollow interior 16. The container 10 is drawn as a cylinder but may define any shape operative to contain a fluid. A terminating end 18 of the side wall 14 may define an opening to receive, or deliver as the case may be, the water into or out from the hollow interior 16. In some embodiments, the terminating end 18 may be configured to receive a cap or spout or cover, though the particular form of such cover should not affect the disclosure. The container 10 may be sized for personal use and/or convenient transportation. For instance, a user may wish to transport the bottle in a backpack, sack, or purse. Scaling the volume of the container 10 down to a conveniently transportable or even hand-holdable size, such as may be achieved by providing a container sized to retain about eight (8) fluid ounces to about 30 fluid ounces, may beneficially ensure that the contained fluid may be mechanically and electrically treated in a timely manner. It may further ensure that the container 10 may be on hand in situations necessitating water sanitation, such as travel to areas without clean water sources, or even in case of emergency.

The system further comprises one or more lights 20 disposed on outer portions of the container 10 such as underneath the bottom end 12. Placing such lights 20 underneath the bottom end 12 may prevent interference with operation of the lights 20 that may occur when a user attempts to grip the side wall 14, for example, however, it is contemplated that placement may vary. The illustrated embodiment is shown for the sake of brevity alone.

In any event, the lights may be placed so that when powered, their emissions may penetrate the container 10 to interact with any fluid and contaminants therein. To this end, various materials may be available to comprise the bottle, such as for example and without limitation, at least partially transparent glass, high-density polyethylene, low-density polyethylene, copolyester, or even polypropylene.

In an embodiment, the lights 20 may be light emitting diodes (LEDs), which those skilled in the art will recognize for their compact size, intensity, ability to emit light in a particular direction, relatively low energy consumption, and relatively longer lifetime than many conventional light sources. Other light sources may similarly be available for use in the system to irradiate pathogens and other fluid contents. Thus, the LEDs discussed and illustrated in the figures are offered by way of example only and not of limitation.

As noted above, the container 10 may be at least partially transparent to transmit wavelengths from the lights 20 that are operative to inactivate or kill contaminants in the water. Therefore, in one embodiment, the lights 20 may radiate at wavelengths known to destroy some pathogens, such as bacteria and other microorganisms. For instance, the lights may emit in the ultraviolet (UV) range of about 100 nm to about 300 nm. In a preferred embodiment, the lights 20 may radiate as shortwave UV-C waves between about 200-280 nm or any range known to deactivate and/or kill undesirable pathogens, bacteria, viruses, or microorganisms, which may be contained in water. It should be noted that although the lights 20 are shown on an outer portion of the container 10, emitting inward, in the figures, it is contemplated that it may be desirable and/or beneficial to dispose such lights 20 on an inner portion of the container 10, such as inside the reservoir 16. One skilled in the art will recognize, for example, that this may aid efficiency by eliminating barriers separating the fluid and irradiating elements. Additionally, it may obviate any need to comprise the container 10 of at least partially transparent materials. Thus, the particular position of the lights 20 with respect to an in and an out side of the container 10 will not limit the invention.

The number of lights 20 provided may vary as needed. Though the figures illustrate three lights 20, it is contemplated that providing more lights 20 along the outer side of the container 10 may ensure that pathogens are inactivated or killed within a relatively shorter period of time, as compared to the use of fewer lights, as further compared to the natural lifespan and/or reproductive cycle of undesirable pathogens. It may be desirable to dispose as many lights 20 as necessary to inactivate or kill a predetermined volume of some pathogens in about 30 seconds to about 20 minutes, or more. Of course, it may be desirable to also, or alternatively, minimize the number of lights 20 used in an effort to decrease the overall weight and bulk of the system and apparatus. Thus the number of lights 20 used is not dispositive.

Any embodiments of the system further comprise a fluid-porous filter and means for generating electricity for powering the sources of light. However, these may take different forms. As such, exemplary, but not limiting embodiments, will be discussed with reference to appropriate figures successively.

Figure 2:
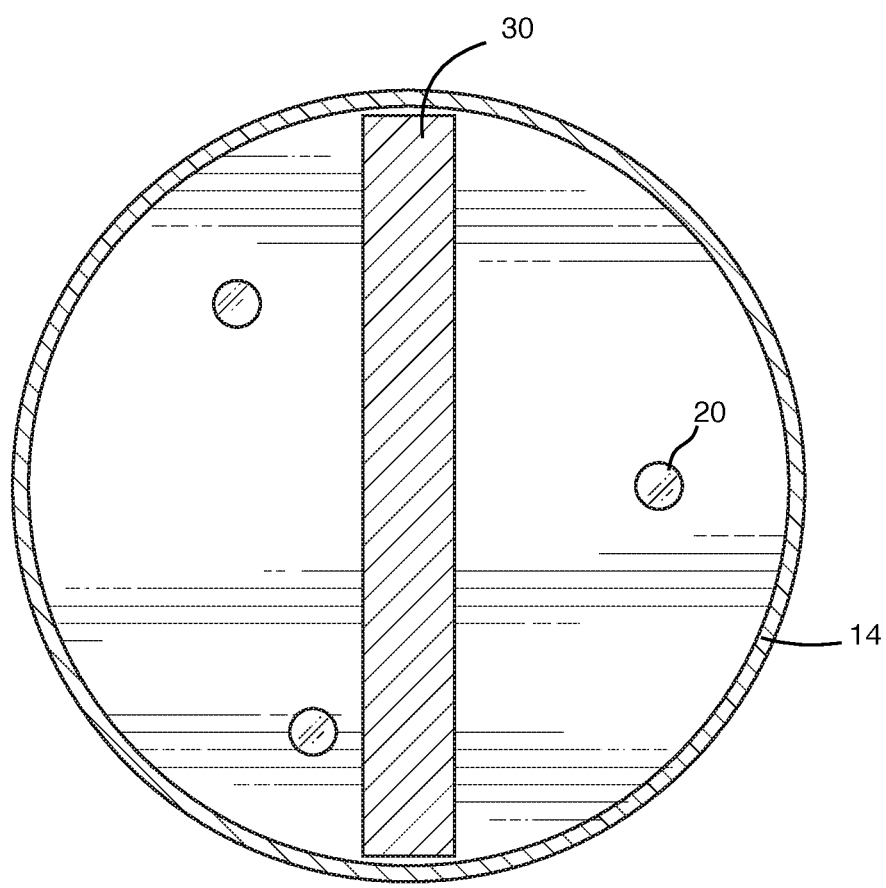
FIG. 2 shows a plan view of the embodiment of the personal water sanitization system from FIG. 1.
Figure 3:
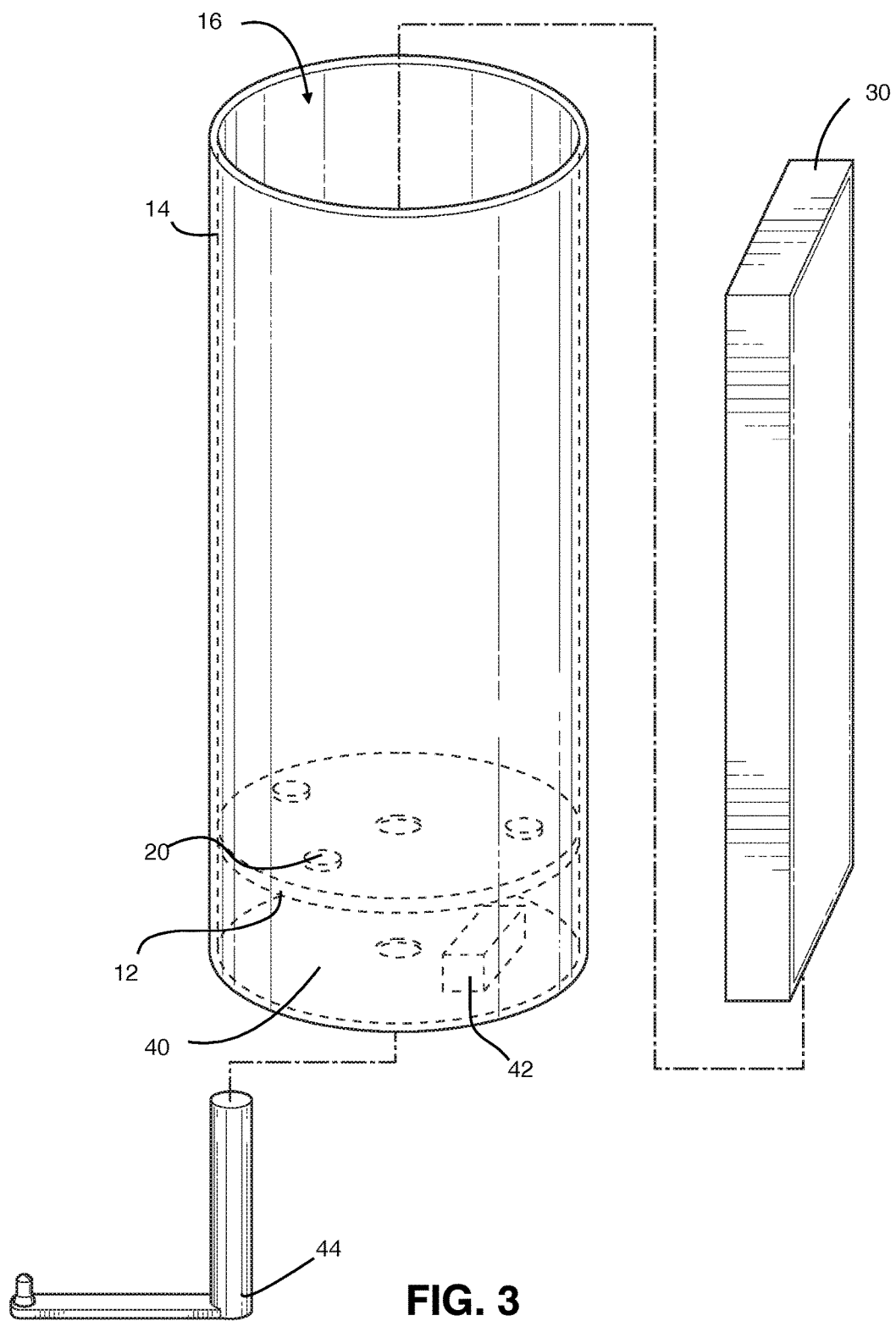
FIG. 3 shows an exploded view of the embodiment of the personal water sanitization system of FIG. 1.

FIGS. 1 through 3 illustrate an embodiment of the system in which the means for powering the lights 20 is disposed beneath the container 10 in a cavity 40 formed by extending the sidewall 14 beyond the bottom end 12. Referring to FIG. 1 in particular, such means comprises a dynamo 42 generator known to those skilled in the art. The dynamo 42 may comprise a manually operable shaft 44 or crank that enables a user to create an electric charge within the dynamo 42 while avoiding dependence on additional sources of electricity. That is, batteries, electrical outlets, and even solar power may be avoided, although it is contemplated that the system may be used with or in combination with such power sources. When the shaft 44 comprising the dynamo is cranked or rotated by the user, an electric charge may be generated that the dynamo may then deliver to the lights, causing them to radiate.

Of course, the position of the dynamo may vary. However, it is contemplated that mechanical and electrical components may avoid damage if secured to an exterior portion of the side wall 14 or even beneath the bottom end 12 of the container, though permanent securement is not necessary to practice the invention. In some embodiments, the means for powering the lights 20 may be mechanically separated from the system when not in use in order, for example, to avoid weight and/or bulk associated with such means. In embodiments such as that shown in FIGS. 1-3, the chamber 40 may define a hole through which the shaft 44 portion of the dynamo 42 may protrude to enable hand cranking from an outside of the chamber 40. Though shown in particular beneath the container 10, one skilled in the art will recognize that the means for powering the lights may be secured to the container 10 via a top end or even side portion of the container 10.

It may be seen that the shaft 44 may additionally communicate with the filter 30, which may be formed, in some non-limiting embodiments, as a block vertically disposable within the hollow interior 16 defined by the container 10. Indeed, to maximize filtered area accessible to fluid within the hollow interior 16, the filter 30 may itself span the vertical length of the container 10, though one skilled in the art will recognize that a shorter, or smaller, filter 30 may also provide sufficient surface area to collect and/or trap undesirable contamination.

The filter 30 in any embodiment may comprise material or combinations of materials operative to capture, trap, adsorb, or otherwise remove contamination from the water or other fluid in the container. For instance, the filter 30 may comprise microporous active carbon particulate operative to adsorb organic impurities that contribute to undesirable tastes and odors in water, and even further adsorb pollutants and chemicals such as chlorine, fluorine, and radon. Additional materials may be mixed with the active carbon to trap other undesirable contaminants. For instance, ion-exchange resins or polymers may be provided to remove ions from molecules defining poisonous and heavy metals from the water and replacing them with, or exchanging them for, ions that are safer for consumption.

In some embodiments, effective filtration may be ensured by moving the filter 30, forcing contaminants in the water or other fluid to come into contact with particles and/or resin comprising such filter 30. Thus, means for effecting this rotation are contemplated. For instance, in the event that the shaft 44 is communicatively linked to the filter 30, the shaft 44 may be rotated by hand, causing the filter 30 itself to rotate within the container 10. In such cases, a seal may be provided to prevent water or other fluid from seeping out of the container through the bottom end 12.

Figure 5:
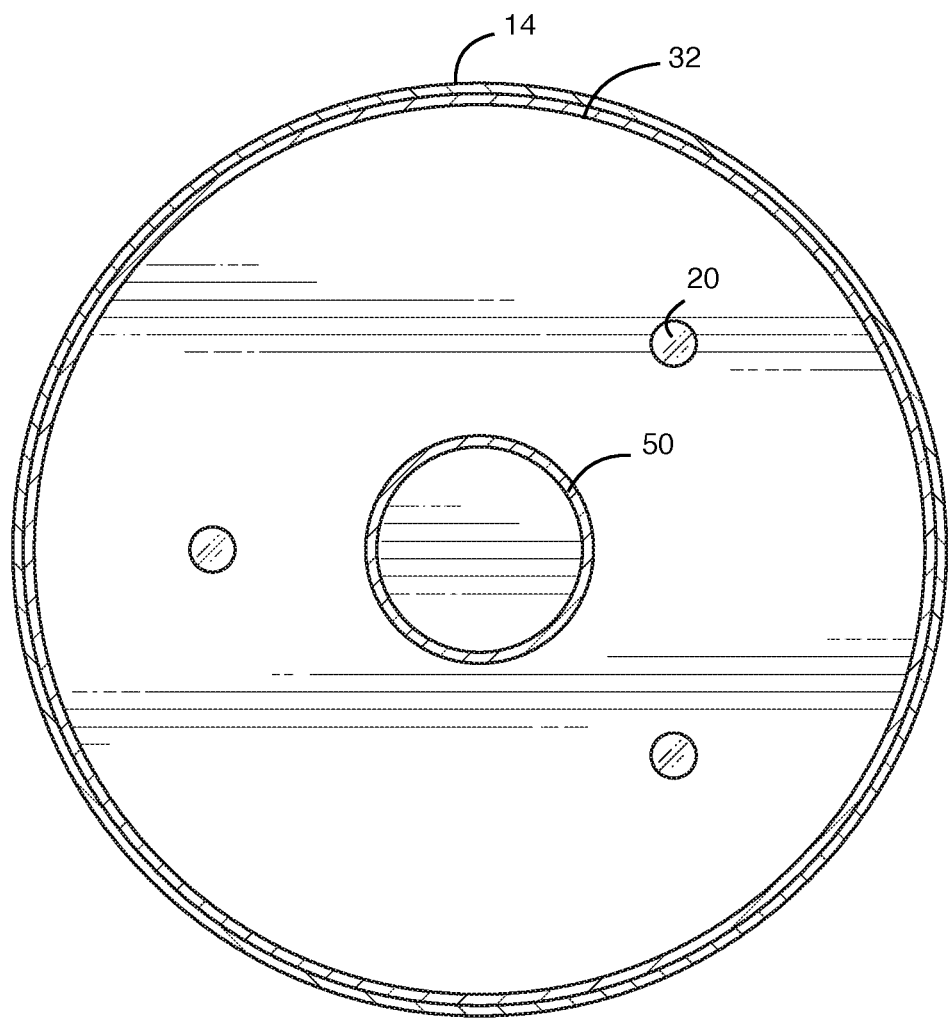
FIG. 5 shows a plan view of the embodiment of the personal water sanitization system of FIG. 4.
Figure 6:
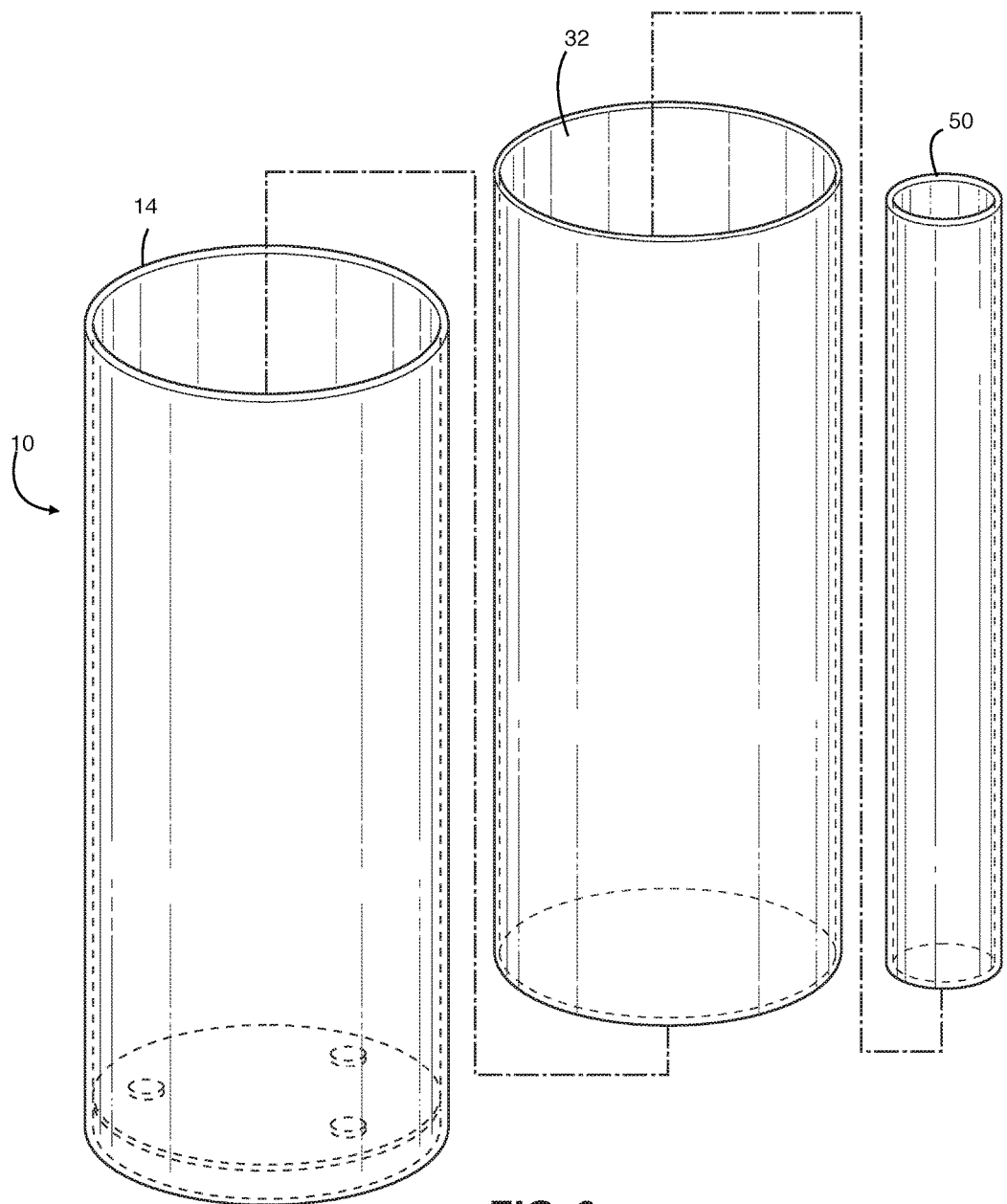
FIG. 6 shows an exploded view of the embodiment of the personal water sanitization system of FIG. 4.

As may be seen in FIGS. 4-6, the filter may alternatively be formed as a rigid cylinder 32 configured to fit within the hollow interior 16 defined by the container. In such cases, contact with contaminants may be guaranteed or at least made likely by agitating the fluid contents, such as by shaking the container 10.

With further reference to FIGS. 4-6, some embodiments of the means for powering the lights 20 may alternatively comprise an elongated conductive coil, housed in an insulating tube 50 for protection, capable of carrying an electrical current to the lights 20 when a magnet is mechanically passed there through. Placement of the coil, housed in the tube 50, and magnet may similarly vary with respect to the container 10. For instance, such means for powering the lights 20 may be placed within the hollow interior 16 of the container 10. Wherever placed, one skilled in the art will recognize that various means are available to selectively power the lights 20, which in turn will be operative to eliminate, or at least decrease, contamination in the water. Indeed, solar and battery power are also contemplated and may be deployed alone or in combination with other means for electrically powering the lights.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, the system and assembly may be used with additional filters and even a cap to prevent debris from entering the hollow interior. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the personal system and apparatus for sanitizing water with which that terminology is associated. In general, the terms used in the following claims should not be constructed to limit the personal system and apparatus for sanitizing water to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the personal system and apparatus for sanitizing water is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the personal system and apparatus for sanitizing water.

What is claimed is:

1. A portable fluid sanitizing assembly, comprising:
   a rugged container having an open upper end and a closed bottom end configured to contain a fluid and further configured to receive a fluid-porous filter, the fluid-porous filter configured to adsorb selected atoms, ions, and molecules present in the contained liquid;
   at least one light source disposed on a portion of the container, said light source positioned so that any emissions therefrom penetrate any fluid in the container, said light source further operative to inactivate or kill at least some of any microorganisms present in the fluid;
   means for optionally powering the light source; and
   mechanical means for moving the fluid-porous filter to force any contaminants in the water to come into contact with material comprising such filter.

2. A system for treating contaminated water, comprising:
   a reservoir having a bottom wall and an impermeable side wall extending upward from said bottom wall to define a hollow interior operative to contain a fluid, the bottom wall of the reservoir further defining a hole to receive a shaft configured to enable mechanical rotation of the fluid-porous filter within said reservoir;
   a plurality of ultraviolet lighting elements operative to irradiate contents in the fluid;
   means for generating electricity to power said plurality of ultraviolet lighting elements; and
   a fluid-porous filter vertically disposable within the receptacle and operative to capture at least some of any organic matter, chemicals, and metal present in the fluid.

3. The system of claim 2, wherein the means for generating electricity to power the plurality of ultraviolet lighting elements is removably securable to an outer portion of reservoir.

4. The system of claim 2, wherein the sidewall extends downward beyond the bottom wall to define a chamber beneath the reservoir, the chamber configured to physically retain and separate the means for generating electricity to power the plurality of ultraviolet lighting elements from any fluid contained within the reservoir.

5. The system of claim 2, wherein the means for generating electricity to power the plurality of ultraviolet lighting elements comprises a hand-operable dynamo in electrical communication with said plurality of ultraviolet light emitting elements.

6. The system of claim 2, wherein the reservoir is at least partially transparent and wherein the ultraviolet lighting elements are disposed along a portion of the outer surface of such reservoir and further positioned such that any emissions generated therefrom penetrate any fluid contained in the reservoir.

7. The system of claim 2, wherein the shaft is additionally configured to enable mechanical operation of the means for generating electricity.

8. The system of claim 2, wherein the filter defines a hollow cylinder vertically disposed within the reservoir along an interior perimeter defined by the side wall of the reservoir.

9. The system of claim 2, wherein the filter comprises at least an activated carbon block.

* * * * *